United States Patent
Hwang et al.

(10) Patent No.: US 10,782,949 B2
(45) Date of Patent: Sep. 22, 2020

(54) RISK AWARE APPLICATION PLACEMENT MODELING AND OPTIMIZATION IN HIGH TURNOVER DEVOPS ENVIRONMENTS

(71) Applicant: INTERNATIONAL BUSINESS MACHINES CORPORATION, Armonk, NY (US)

(72) Inventors: Jinho Hwang, Ossining, NY (US); Tonghoon Suk, Yorktown Heights, NY (US); Zemei Zeng, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 15/865,121

(22) Filed: Jan. 8, 2018

(65) Prior Publication Data
US 2019/0212995 A1 Jul. 11, 2019

(51) Int. Cl.
| | |
|---|---|
| H04L 29/08 | (2006.01) |
| G06F 8/60 | (2018.01) |
| H04L 12/24 | (2006.01) |
| G06F 8/65 | (2018.01) |
| G06F 11/30 | (2006.01) |
| G06F 8/61 | (2018.01) |

(52) U.S. Cl.
CPC .......... *G06F 8/60* (2013.01); *G06F 8/61* (2013.01); *G06F 8/65* (2013.01); *G06F 11/30* (2013.01); *H04L 41/082* (2013.01); *H04L 41/5019* (2013.01); *H04L 67/34* (2013.01); *H04L 41/5096* (2013.01)

(58) Field of Classification Search
CPC ..... G06F 8/60; G06F 8/61; G06F 8/65; G06F 11/30; H04L 41/082; H04L 431/5019; H04L 67/34; H04L 41/5096
See application file for complete search history.

(56) References Cited

U.S. PATENT DOCUMENTS

| | | |
|---|---|---|
| 6,877,035 B2 | 4/2005 | Shahabuddin et al. |
| 7,310,672 B2 | 12/2007 | Rolia |
| 8,627,322 B2 | 1/2014 | Chaudhry et al. |
| 9,621,435 B2 | 4/2017 | Vasudevan et al. |
| 9,740,550 B2 | 8/2017 | Mizobuchi et al. |

(Continued)

FOREIGN PATENT DOCUMENTS

WO 2012058003 A2 5/2012

OTHER PUBLICATIONS

Bauer, "Risk Thinking for Cloud-Based Application Services" Taylor & Francis Group, LLC (2017).

(Continued)

*Primary Examiner* — Viet D Vu
(74) *Attorney, Agent, or Firm* — Intelletek Law Group, PLLC; Gabriel Daniels, Esq.

(57) ABSTRACT

A method and system of provisioning a release of an application are provided. An average arrival rate for the application is calculated. A residual capacity of each node in a pool of nodes is determined. A risk dependent state of each node is determined. For each node, a failure index based on the average arrival rate of the application, the residual capacity of the node, and the risk dependent state of the node, is calculated. The release of the application is provisioned on a node in the pool of nodes, based on the calculated failure index.

20 Claims, 9 Drawing Sheets

(56) References Cited

U.S. PATENT DOCUMENTS

| | | | |
|---|---|---|---|
| 2012/0317058 A1* | 12/2012 | Abhulimen | G06N 20/00 |
| | | | 706/2 |
| 2015/0363249 A1* | 12/2015 | Mizobuchi | G06F 11/3452 |
| | | | 714/47.3 |
| 2016/0112451 A1* | 4/2016 | Jevans | H04L 63/1433 |
| | | | 726/25 |
| 2016/0357660 A1 | 12/2016 | Dean et al. | |
| 2017/0161062 A1 | 6/2017 | Banerjee et al. | |
| 2017/0200006 A1* | 7/2017 | Gershoni | G06Q 50/10 |
| 2019/0018671 A1* | 1/2019 | Zhu | H04L 43/04 |

OTHER PUBLICATIONS

Quintero et al., IBM Platform Computing Solutions for High performance and Technical Computing Workloads (ibm.com/redbooks) (2015).

Unhelkar, "Big Data Strategies for Agile Business Framework, Practices, and Transformation Roadmap", CRC Press, (2017).

Davenport, "Competing on Analytics," Harvard Business Review (2006.

Fu et al., "Process-Oriented Non-Intrusive Recovery for Sporadic Operations on Cloud", 2016 46th Annual IEEE/IFIP International Conference on Dependable Systems and Networks.

Mell et al., "The NIST Definition of Cloud Computing," NIST Special Publication 800-145.

* cited by examiner

```
SUMMARY LIKE '% ping%'
OR SUMMARY LIKE '%bad%server%status%'
OR SUMMARY LIKE '%cluster resource%failed%'
OR SUMMARY LIKE '%cluster% resource %offline%'
OR SUMMARY LIKE '%nod%down%'
OR SUMMARY LIKE '%node down%Abstract'
OR SUMMARY LIKE '%problem with monitored url%'
OR SUMMARY LIKE '%server%down%'
OR SUMMARY LIKE '%server%not responding%'
OR SUMMARY LIKE '%web site%not in a started state%'
```

RISK AWARE APPLICATION PLACEMENT MODELING AND OPTIMIZATION IN HIGH TURNOVER DEVOPS ENVIRONMENTS

BACKGROUND

Technical Field

The present disclosure generally relates to cloud orchestration management, and more particularly, to application placement modeling and optimization in a cloud computing environment.

Description of the Related Art

Today, there is an ever-increasing number of cloud based applications, sometimes referred to as cloud apps, that rely on remote servers for processing logic that is accessed through a web browser. Such architecture enables access to a shared pool of configurable computing resources with minimal management effort. Cloud-based systems are typically changed more frequently than traditional systems. These frequent changes involve iterative operations such as installations, reconfigurations, and upgrades, which may be in the context of a software development environment, sometimes referred to as DevOps. DevOps, an abbreviated combination of Development and Operations, may involve automation and monitoring of the steps of software construction, from integration, testing releasing to deployment and infrastructure management.

SUMMARY

According to various embodiments, a computing device, a non-transitory computer readable storage medium, and a method of provisioning a release of an application are provided. An average arrival rate for the application is calculated. Resource parameters of the application are determined. A residual capacity of each node in a pool of nodes is determined. A risk dependent state of each node is determined. An average sojourn time for each node is determined. For each node, a failure index based on the average arrival rate of the application, the resource parameters of the application, the residual capacity of the node, the risk dependent state of the node, and an average sojourn time of the node, is calculated. The release of the application is provisioned on a node in the pool of nodes, based on the calculated failure index.

In one embodiment, resource parameters of the application are determined as well as an average sojourn time for each node. Accordingly, the failure index for each node is further based on the determined resource parameters, and the determined sojourn time of the node.

In one embodiment, provisioning the release of the application is on a node that is calculated to have a lowest failure index.

In one embodiment, the resource parameters of the application include at least one of: (i) computing, (ii) memory, and (iii) storage resources to run the application.

In one embodiment, determining the residual capacity of a node includes determining a static capacity of the node. A dynamic usage of the node is determined. A difference between the static capacity and the dynamic usage of the node is calculated.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Today, especially in high turnover DevOps environments, operations, such as installation, reconfiguration, or upgrade, collectively referred to herein as a "release," is performed frequently. While traditionally releases of applications in production may have been performed once per quarter or year, with the advent of DevOps, there can be dozens of deployments per day.

The DevOps approach can be implemented using a cloud infrastructure, discussed in more detail later. For example, a rolling upgrade operation can be implemented using cloud infrastructure APIs to upgrade an application without impacting its availability, by iteratively upgrading a small number of its virtual machines (VMs) at a time. In other scenarios, an application may be upgraded frequently to keep up with public demand. However, such operations have risk of failure or may not be optimized.

To that end, in one aspect, the present disclosure evaluates the parameters of the application, calculates an average arrival rate thereof, and determines a capacity and residual capacity of each node in a pool of nodes. For each node, a risk dependent state of each node, as well as an average sojourn time are determined. For each node, a failure index is then calculated based on the average arrival rate, the resource parameters of the application, the residual capacity of the node, the risk dependent state of the node, and the average sojourn time. The release of the application is provisioned based on the lowest calculated failure index. By virtue of the concepts discussed herein, the probability of failure of the subject application is substantially reduced, as well as other applications controlled by a modeling and optimization engine, while the computing resources of the cloud are conserved. Reference now is made in detail to the examples illustrated in the accompanying drawings and discussed below.

Example Architecture

Figure 1:
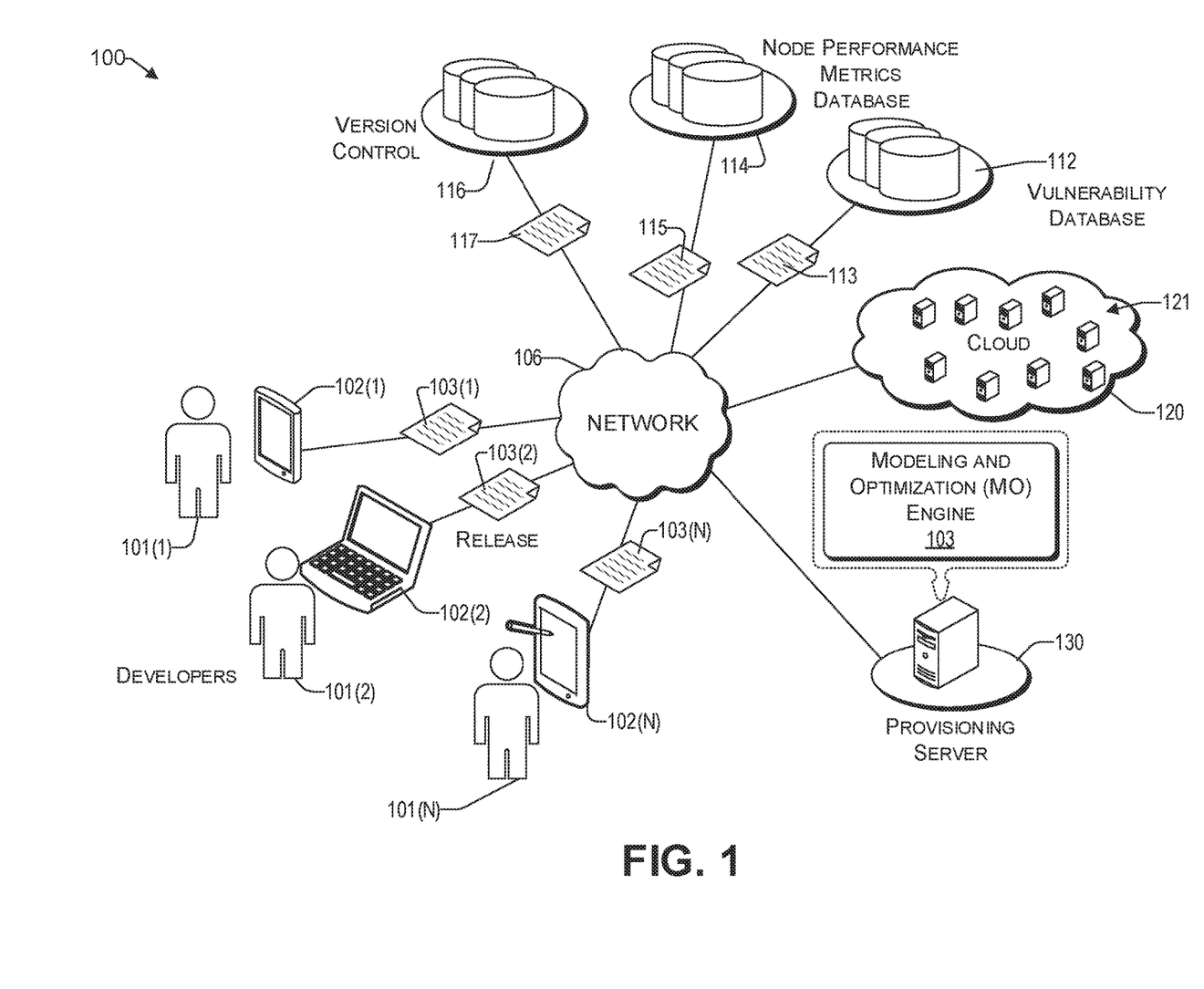
FIG. 1 illustrates an example architecture for provisioning a release of an application into a distributed computing environment.

FIG. 1 illustrates an example architecture 100 for provisioning a release of an application onto a distributed computing environment. Architecture 100 may include one or more computing devices 102(1) to 102(N) that are operated by developers 101(1) to 101(N), respectively. There is a vulnerability database 112, a node performance metrics database 114, a provisioning server 130 having a modeling and optimization (MO) engine 103, and a cloud 120. As used herein, a developer is an individual or an organization that provides software applications or updates thereof. In various scenarios, each developer 101(1) to 101(N) may be related to a different application, or one or more of the developers may work together on a same application, which is to be provisioned on the resources of the cloud 120.

Accordingly, the network 106 allows various developers 101(1) to 101(N) to communicate with each other, other users of the network 106, and various resources that are connected to the network 106, such as the vulnerability database 112, provisioning server 130, and the cloud 120, via their computing devices 102(1) to 102(N), respectively. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various application stores, libraries, the Internet, and the cloud 120.

For purposes of later discussion, several computing devices appear in the drawing, to represent some examples of the devices that may receive various resources via the network 106. Today, computing devices typically take the form of tablet computers, laptops, desktops, personal digital assistants (PDAs), portable handsets, smart-phones, and smart watches, although they may be implemented in other form factors, including consumer, and business electronic devices.

Architecture 100 may include a vulnerability database 112 configured to store and maintain an up-to-date list of server security concerns, referred to herein as vulnerabilities. The vulnerability database 112 may include names of different versions of operating systems, patches (or links to patches) for identified vulnerabilities, etc. For example, the vulnerability database 112 may be maintained by a security software company or a consortium of organizations and/or individuals interested in network security, such as the National Vulnerability Database (NVD), US-CERT Vulnerability Notes Database, Open Sourced Vulnerability Database (OSVDB), X-FORCE by IBM, and the like. The vulnerability database 112 provides data 113 that includes server security information in the form of data packets to the MO engine 103 of the provisioning server 130, at predetermined intervals or upon a trigger event. In one embodiment, the security information 113 may include identified vulnerabilities with their corresponding CVSS score related to the vulnerability.

The architecture 100 may include a node performance metrics database 114 configured to store performance metrics 115 of each node 121 of the cloud 120. For example, the node performance metrics database may interact with a node 121 at predetermined intervals or upon a trigger event to determine its static capacity, dynamic usage, exposure to vulnerabilities (e.g., operating system, patches, etc.), residual capacity, and the like, to create performance metrics 115 for each node 121 being monitored. In this way, a failure rate of each relevant node can be determined.

The security information 113 from the vulnerability database 112 together with the performance metrics 115 can then be used by the MO engine 103 to identify the risk dependent state of available nodes (i.e., servers) 121 in the cloud 120. The risk dependent states and the cloud are discussed in more detail later.

The architecture 100 includes an MO engine 103, which is a program that runs on the provisioning server 130. In various embodiments, the MO engine 103 is configured to gather various metrics of the application being released, vulnerability information 113, performance metrics 115, states of the nodes 121, etc., in order to place a release (e.g., 103(2)) received from a developer, with an appropriate node 121 in the cloud 120, such that a risk of failure of a released application is minimized.

To that end, the MO engine 103 evaluates parameters of both the release as well as the cloud resources available. For example, an average arrival rate for a release (e.g., 103(1)) as well as a resource requirement is determined. As used herein a resource requirement includes the computing power (e.g., CPU), memory, and/or storage amount for successfully operating the application of the release. An arrival rate relates to how often an application is updated. In this regard, there may be a version control repository 116 that is operative to provide distributed version control functionality 117 of Git. In this way, the changes in an application can be tracked and the average arrival rate (e.g., Git-commit frequency) can be determined by the MO engine 103.

Further, the MO engine 103 is configured to determine the available resources of the cloud 120. For example, a static capacity, dynamic usage, and residual usage of each node 121 may be determined. As used herein, a static capacity relates to processing, memory, and/or storage capability. Dynamic usage relates to the portion of the static capacity that is being actively used. The residual capacity is the difference between the static capacity and the dynamic usage.

Based on the parameters of each node, coupled with the security information, a risk dependent state of each node 121 of the cloud 120 can be determined by the MO engine 103. For example, the risk dependent state is attributed a score which may be alpha-numeric (e.g., 0 to 10, A to F), descriptive (e.g., low, medium, and high), based on color (e.g., red, green, and yellow), or any other suitable rating scale. By way of example only, and not by way of limitation, the risk dependent state of each node 121 will be described herein on a scale of 0 to 10, where 0 has a lowest risk and 10 a highest risk of failure of a node. Based on the risk dependent state, a failure probability of the node can be identified for a unit time. For example, the probability of failure maybe 10% for state 8 and 30% for state 10. Thus, a server in state i has a failure probability $p_i$.

The MO engine 103 is further configured to determine the average sojourn time for a state of a node. As used herein, a sojourn time is the duration a node (i.e., server) stays in a same state. The sojourn time for a server to stay in state i has a mean $\mu_i$. In this regard, it is noted that transitions from one state to another are associated with risk, due to the unpredictable nature of the transition and the performance of the node in the new state. Accordingly, in one embodiment, the sojourn time is used as one of the parameters in the determination of an appropriate node for a new release.

While the vulnerability database 112, node performance metrics database 114, version control repository 116, and provisioning server 130 are illustrated by way of example to be on different platforms, in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage.

Example Block Diagram of a Cloud Orchestration Management

Figure 2:
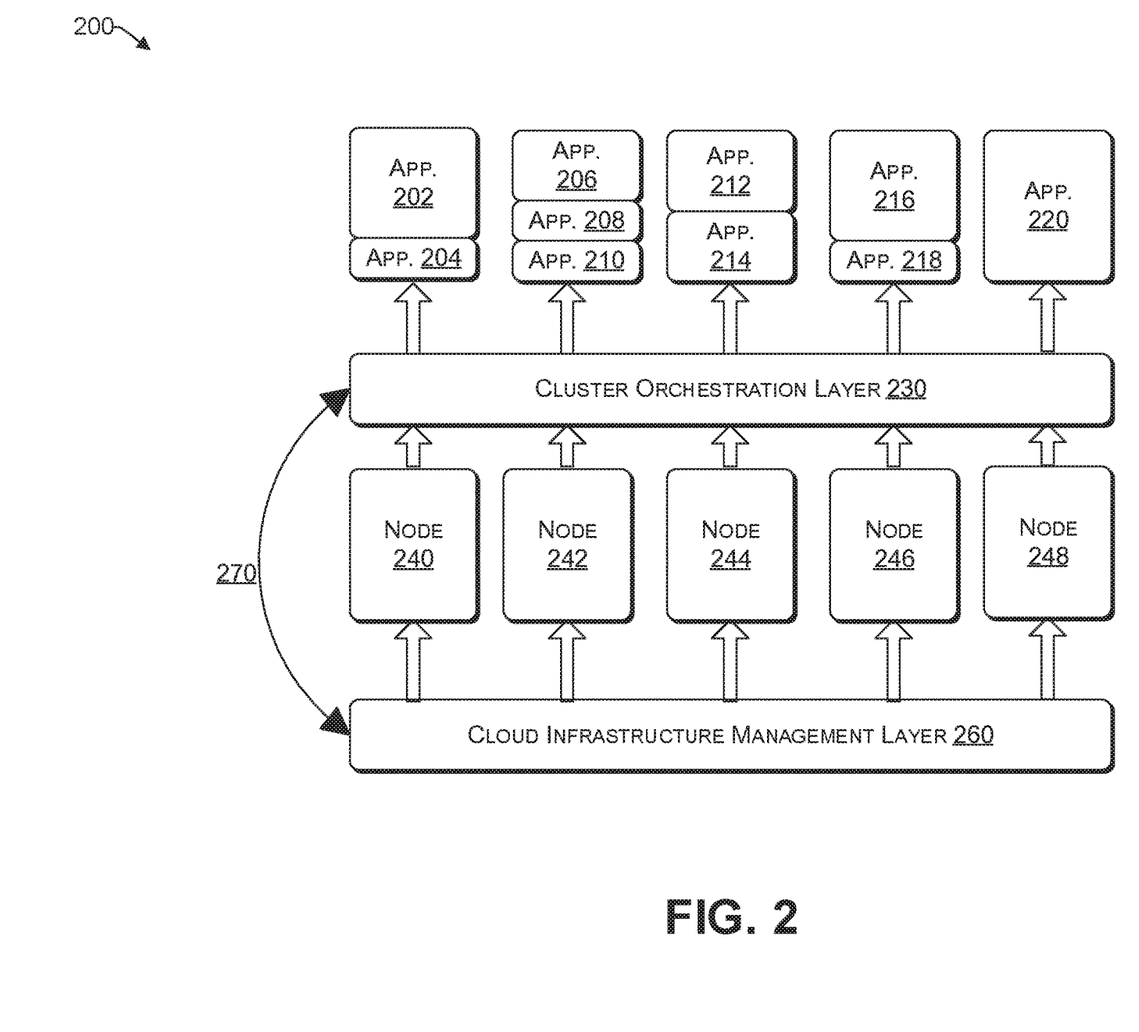
FIG. 2 illustrates a block diagram of an architecture of the cloud orchestration management.

There are several orchestration layers that may be used in the system 100 of FIG. 1. In this regard, FIG. 2 illustrates a block diagram 200 of an architecture of the cloud orchestration management. The system includes various applications, represented by blocks 202 to 220, which may be of different complexity and resource intensity. There is a cluster orchestration layer 230 which acts as an interface between the computing nodes 240 to 248 and the applications 202 to 220. The cluster orchestration layer 230 is configured to acquire node resources for executing a job related to the corresponding application.

The cluster orchestration layer 230 is configured to provide automated deployment, scaling, and management of (e.g., containerized) applications, such as Kubernetes. It provides a platform for these functions across clusters of nodes 240 to 248. It supports a range of container tools, including Docker. In one embodiment, cluster orchestration layer 230 also supports Docker swarm, a clustering and scheduling tool for Docker containers.

The cluster orchestration layer 230 manages computing resources across a cluster of worker nodes 240 to 248. It provides low-level scheduling of cluster resources across applications 202 to 220. It enables multiple applications to share cluster resources and run on the same worker nodes. Among other functions, it provides scheduling, service registry, replication, overlay, etc. Unlike traditional orchestration layers, the cluster orchestration layer 230 discussed herein can take into consideration the information provided by the cloud infrastructure management layer 260. In one embodiment, the MO engine 103 is part of the cluster orchestration layer 230. Accordingly, the cluster orchestration layer 230 is configured to optimize the application deployment (e.g., placement) of the application to the appropriate node.

The cloud infrastructure management layer 260 is configured to provide compliance, patch, upgrade, and monitoring functions to each virtual machine (sometimes referred to herein as node) 240 to 248. In this regard, it is noted that monitoring is a salient part of application management, particularly in distributed computing, which involves various nodes. In addition to instrumenting a distributed system, the cloud infrastructure management layer 260 collects and provides various metrics to determine and report the health of each node at predetermined intervals and/or upon a trigger event.

In one embodiment, the cluster orchestration layer 230 receives the performance metrics of each node 240 to 248 from the infrastructure management layer 260. Thus, the cloud infrastructure management layer 260 is aware of the static capacity, dynamic usage, and the residual capacity of the nodes 240 to 248 managed thereby. Unlike traditional architectures where there is a disconnect between the cluster orchestration layer 240 and the cloud infrastructure management layer 260, in the architecture of FIG. 2, the cluster orchestration layer 230 specifically communicates with the cloud infrastructure management layer 260 to better determine the appropriate assignment of the application release to the node calculated to offer the least amount of calculated risk. In this way, the risk of failure of the node, and by extension the application released, is reduced, and overall computational efficiency for all applications managed by the cluster orchestration layer 230 is improved.

Example Data Analysis by the Modeling and Optimization Engine

Figure 3:
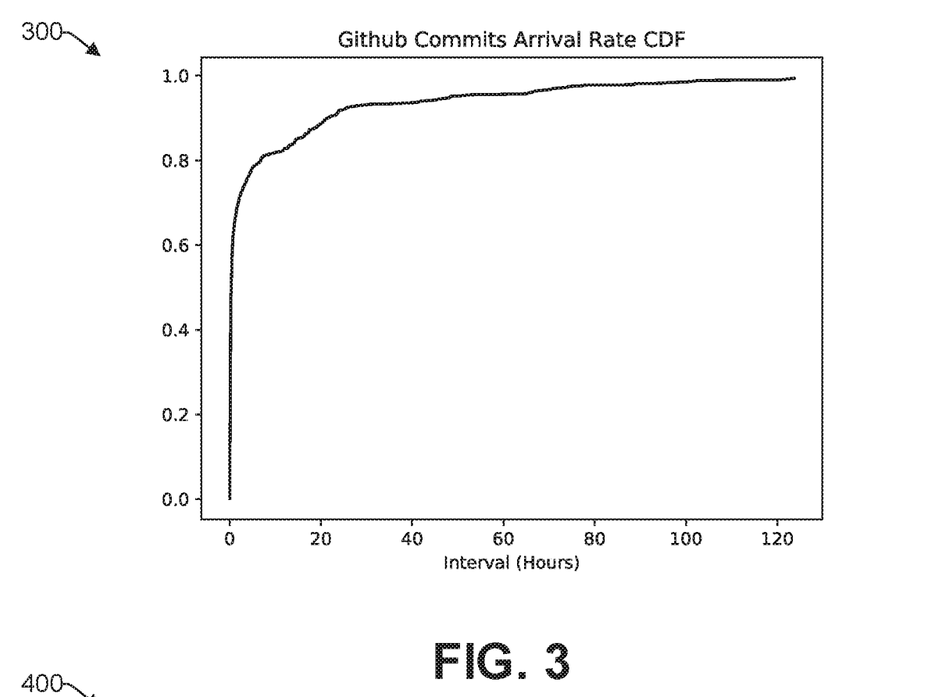
FIG. 3 illustrates an example graph of the arrival rate for a received application.

FIG. 3 illustrates an example graph of the arrival rate for a received application. By way of example only and not by way of limitation, graph 300 illustrates the probability of a GitHub commit over time in the form of a cumulative distribution function (CDF). In the example of FIG. 3, there is approximately a 0.8 (i.e., 80%) probability of an update with respect to an application in a 10-hour period. Of course, the probability increases as the time interval progresses. In one embodiment, the version control repository (116 of FIG. 1) can provide the raw information regarding average arrival rates for different applications to the MO engine 103, which then processes the data 117 to determine the average arrival rate for an application therefrom.

Figure 4:
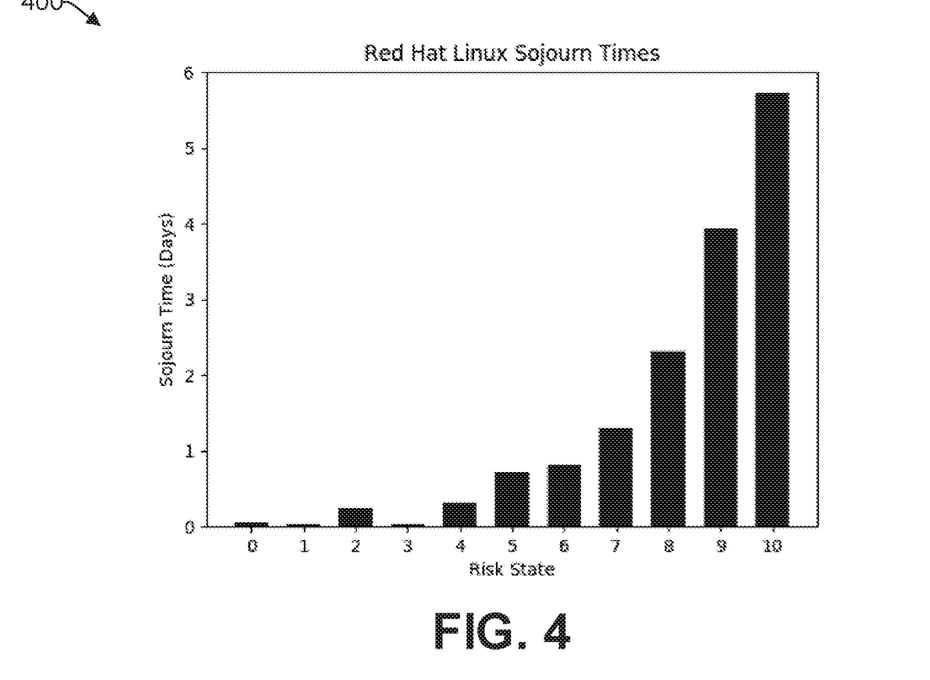
FIG. 4 illustrates an example bar graph of sojourn time vs. the risk dependent state.

FIG. 4 illustrates an example bar graph 400 of sojourn time (in days) vs. the risk dependent state. In this regard, it is noted that the sojourn time is independent of the risk level. Rather, in one embodiment, the sojourn time is based on how the patches are released from the vendor and how patches are applied to the nodes.

Figure 5A:
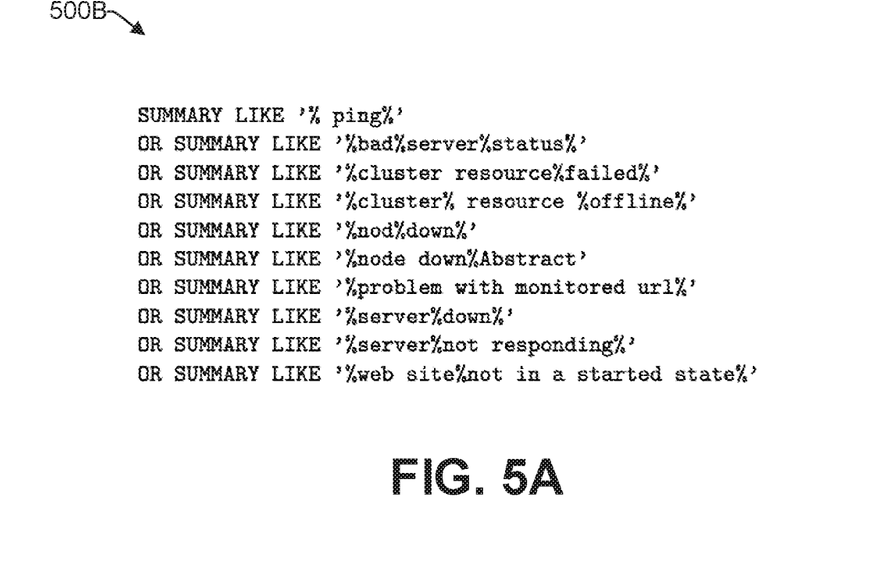
FIG. 5A illustrates example code that may be used to determine a status of the server.

FIG. 5A illustrates example code 500B that may be used to determine a status of the server. In various embodiments, the query may be performed by the node performance metrics database 114 directed to a subject node. The results of the query are then provided by way of a performance metrics data packet 115 to the MO engine 103. Alternatively, the query can be performed directly by the MO engine 103 to a node. The query, whether by the node performance metrics database 114 or the MO engine 103 can be performed at predetermined intervals or upon a trigger event (e.g., upon receiving a new release of an application from a developer). In various embodiments, the node may be selected randomly or based on a predetermined list until all available nodes 121 in the cloud 120 are evaluated.

In one embodiment, upon finding a predetermined number of nodes that meet one or more threshold criteria (e.g., having a residual capacity that is above a threshold) and in a state that is above a threshold, then the query stops. In this way, the computing resources of the provisioning server 130 are not unnecessarily consumed.

Figure 5B:
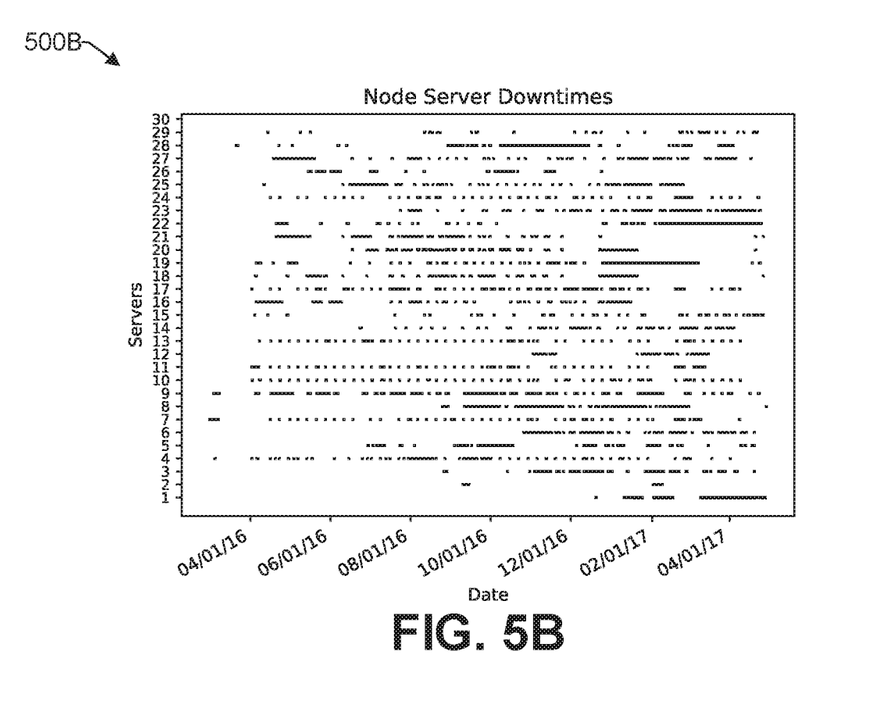
FIG. 5B provides a visual representation of node downtimes over time, consistent with an illustrative embodiment.

FIG. 5B provides a visual representation of node downtimes over time, consistent with an illustrative embodiment. For example, the downtimes for nodes (e.g., servers 1 to 30)

are illustrated by way of dark intervals over time. In this way, for each node, a failure rate and its sojourn time can be identified.

Example Failure Index Algorithms

As discussed above, the MO engine 103 considers various parameters in determining the placement of a release of an application. Such parameters may include (i) the average sojourn time $\mu_i$ for a node (e.g., server) to stay in state i (e.g., 0, 1, ..., 10); (ii) failure probability $p_i$ for each state i; and (iii) arrival rate $\lambda_j$ for application j. These parameters may be used to calculate different failure indexes, as described below. In one embodiment, a first failure index r is provided by equation 1 below:

$$r_{i,j} = r_{i,j}((u_1,p_1),(\mu_2,p_2), \ldots ,(u_{10},p_{10}),\lambda_j) \quad \text{(Eq. 1)}$$

Where:
i is the state of the node;
j is the application being released;
$\lambda_j$ is the arrival rate for application j;
p is the probability of failure; and
$\mu_i$ is the number of nodes (e.g., servers) in the state i.

We find a state i for application j ($j_0, j_1, \ldots, j_{10}$) such that the expression in equation 2 below is satisfied.

$$r_{j_0,j} \le r_{j_1,j} \le \ldots \le r_{j_{10},j} \quad \text{(Eq. 2)}$$

When application j is released, the following expressions are satisfied:

$$k \leftarrow 0,$$

$$i \leftarrow j_k$$

While ( a server in state i):

$$i \leftarrow j_{k+1}$$

Where: k is a node state index of an application. This constraint means the application j is allocated to a least loaded server in state i.

The conditions that are presented in the context of equation 2 are used to constrain the equation. The objective is to calculate the failure rate r such that a node with a minimum failure rate can be identified.

The first failure index $r_{i,j}$ only depends on states and arrival rates. The failure probability for a state is provided in equation 3 below:

$$r_{i,j} = p_i \quad \text{(Eq. 3)}$$

The first failure index $r_{i,j}$ is special in that it represents the failure of the node i when an application is first assigned (released). In this regard, it is noted that when the application is first assigned, the arrival rate $\lambda_j$ is unknown.

The myopic failure rate is provided by equation 4 below, which takes the average sojourn time $\mu_i$ for a node time into consideration:

$$r_{i,j} = p_i/\mu_i \quad \text{(Eq. 4)}$$

While the approach based on FIGS. 1 to 4 provides a good failure index for determining an appropriate node to provision the release of the application, applicant has identified that there is still room for improvement. To that end, a second failure index, sometimes referred to herein as a "long-term failure index," is provided that includes the sojourn times of the nodes and the arrival rate of the application. Stated differently, the long-term failure index takes into consideration that a node in state i fails before the next release of application j. The probability that a server in state i fails before the next arrival of the application j is provided by equation 5 below:

$$r_{i,j} = p_i \times \frac{\mu_i}{\mu_i + \lambda_j} + (1-p_i) \times \frac{\mu_i}{\mu_i + \lambda_j} \times p_{i+1} \times \frac{\mu_{i+1}}{\mu_{i+1} + \lambda_j} + \ldots + \quad \text{(Eq. 5)}$$

$$(1-p_i) \times \frac{\mu_i}{u_i + \lambda_j} \times \ldots \times (1-p_9) \times \frac{\mu_9}{\mu_9 + \lambda_j} \times p_{10} \times \frac{\mu_{10}}{\mu_{10} + \lambda_j} +$$

$$(1-p_i) \times \frac{\mu_i}{u_i + \lambda_j} \times \ldots \times (1-p_9) \times \frac{\mu_9}{\mu_9 + \lambda_j} \times$$

$$p_{10} \times \frac{\mu_{10}}{\mu_{10} + \lambda_j} \times \left( \frac{(1-p_{10}) \times \frac{\mu_{10}}{\mu_{10} + \lambda_j}}{1 - (1-p_0) \times \frac{\mu_{10}}{\mu_{10} + \lambda_j}} \right)$$

Figure 6:
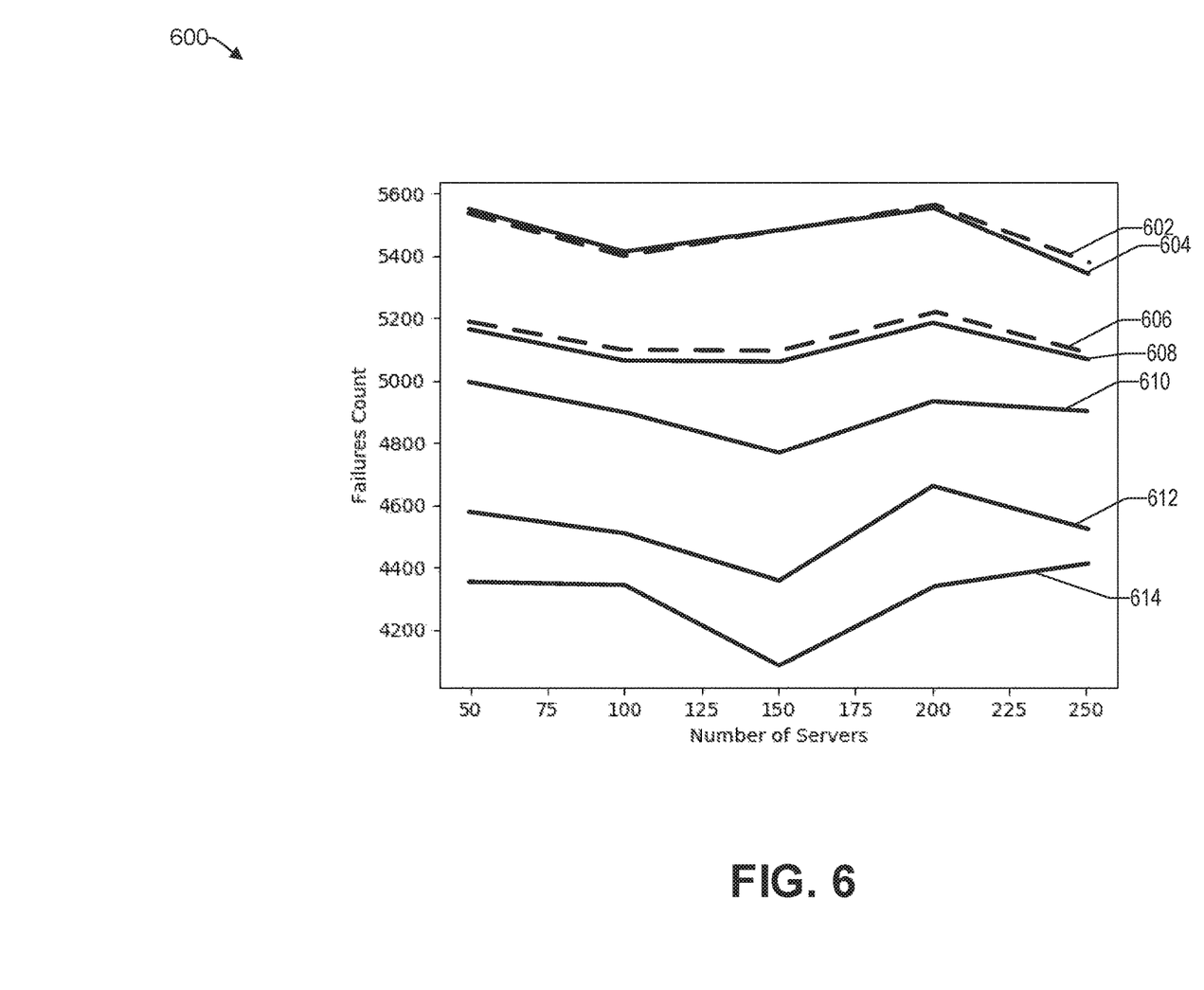
FIG. 6 is a chart of failure count vs. number of servers for different failure indexes.

FIG. 6 is a chart 600 of failure count vs. number of servers for different failure indexes. The failure count of the vertical axis represents the total number of failures during an experiment (i.e., predetermined time period). Curve 602 represents a Lowest State Least Capacity (LSLC) approach, where the failure count is mostly over 5400. Curve 604 represents a node selection based on a lowest state of available servers. Stated differently, a node is selected that has a lowest risk dependent state in the pool of available nodes. The failure count is similar to that of the LSLC 602.

Curve 606 represents a Least Capacity Lowest State (LCLS) algorithm, which provides a reduced failure count between 5100 and 5200. The lowest state indicates having the lowest failure probability. Curve 608, which is based on a least capacity algorithm, provides marginally better results. Curve 610 represents an algorithm where a placement node is selected at random. Curve 612, which takes the average sojourn time $\mu_i$ for a node time into consideration, provides improved results, where the failure count is reduced to 4400 to below 4700. The best results are obtained by the long-term failure index based algorithm disclosed herein, represented by curve 614. By virtue of this approach, a 25% reduction in failure rate is achieved with respect to the least capacity algorithm 608.

FIG. 6 also illustrates that there is an optimal number of nodes to accommodate the applications that are controlled by the MO engine 103. The failure rate does not linearly go down with the number of nodes used for the applications. Rather, there is a specific number, or range of numbers, that provides an overall reduced failure rate. In the example of FIG. 6, for a long-term failure index approach, the optimal number of nodes is 150, based on the number of applications that are controlled by the MO engine 103.

In one embodiment, the number of nodes (e.g., virtual machines) that should be used for the applications that are controlled by the MO engine 103, can be calculated. The number of nodes that are in each state on average $u_i$ can be determined from mean-field limits, which is a summarization of nodes. The following expression is minimized:

$$\text{Minimize} \rightarrow \Sigma_{i,j} r_{i,j} x_{i,j}$$

$$\text{Subject to} \rightarrow \Sigma_j s_j x_{i,j} \le C u_i$$

Where,
$s_i$ is the resource requirement of the application;
C is the capacity of the server;
$\mu_i$ is the number of nodes that are in state I; and
$x_{i,j}$ is a binary value 1 that is asserted if the application j is in a node with state i.

Accordingly, the effect of all the other elements of any given element is approximated by a single averaged effect. In this way, a large volume of data can be summarized efficiently.

Example Processes

Figure 7:
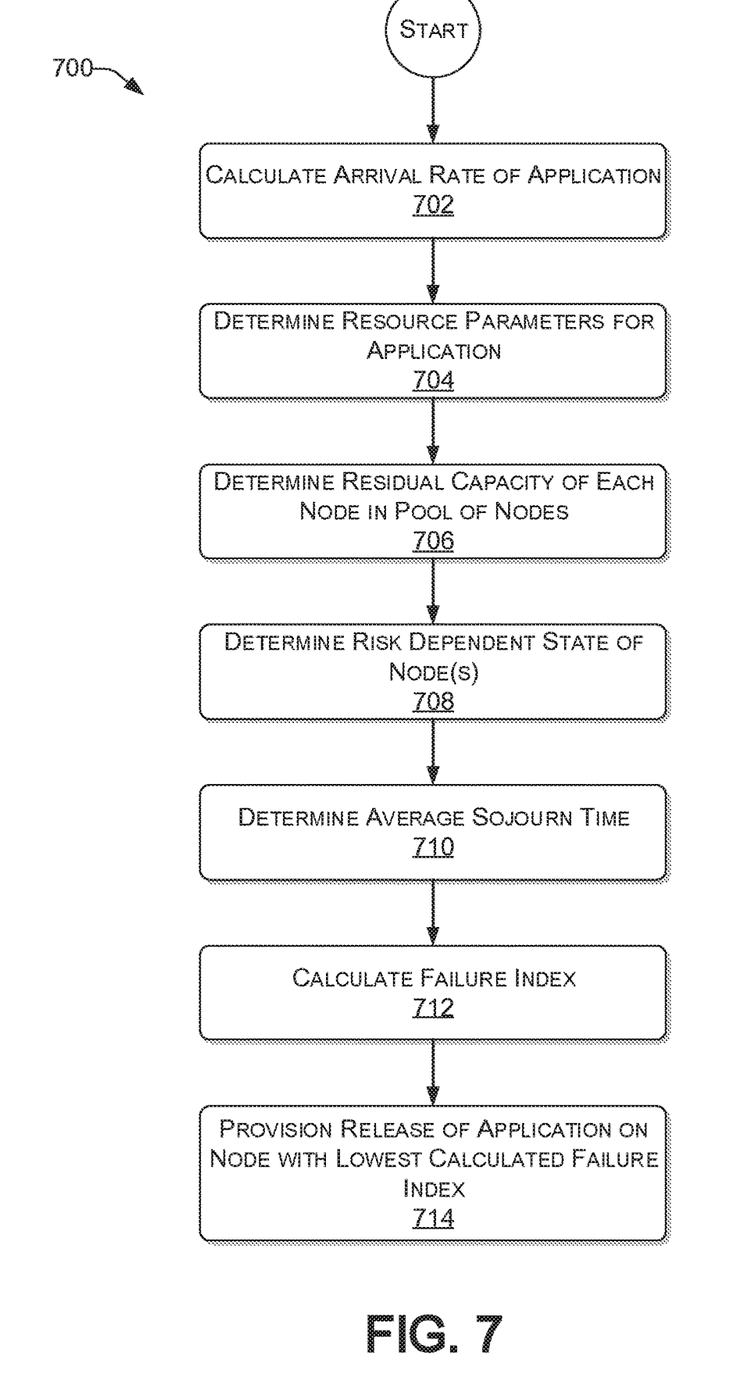
FIG. 7 presents an illustrative process to provisioning a release of an application onto an appropriate node of a cloud.

With the foregoing overview of the example architecture 100 and block diagram 200 of an architecture of the cloud orchestration management, it may be helpful now to consider a high-level discussion of an example processes. To that end, FIG. 7 presents an illustrative process to provisioning a release of an application onto an appropriate node in the cloud. Process 700 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 700 is described with reference to the architecture 100 of FIG. 1.

At block 702, the MO engine 103 calculates an arrival rate of an application to be released. In various embodiments, the arrival rate may be determined at predetermined intervals for one or more applications that are administered by the MO engine 103 or upon a new release of a subject application.

At block 704, the resource parameters for the subject application to be released are determined. The resource parameters include at least one of: (i) computing, (ii) memory, and (iii) storage resources to run the application. In this way, the MO engine 103 can better match the application with an appropriate node in the cloud 120.

At block 706, the MO engine 103 determines a residual capacity of each node in a pool of nodes 121 in the cloud 120 that is associated with the MO engine 103. To that end, for each node, the static capacity and the dynamic usage of the node are determined. As described previously, the static capacity relates to the processing, memory, and/or storage capability of the node, while the dynamic usage relates to the portion of the static capacity that is being actively used. The residual capacity is determined by the MO engine 103 by taking the difference between the static capacity and the dynamic usage for the node.

In one embodiment, upon determining that the residual capacity of a node is below a predetermined threshold, then the node is eliminated from the subsequent processes of blocks 708 to 714. For example, the predetermined threshold may be based on the resource parameters of the application. Stated differently, if a node is deemed not to have sufficient resources to accommodate the resource requirements of the application, then the node is deemed to be disqualified and is not included in further analysis, thereby saving computational resources of the provisioning server 130 and expediting the provisioning process.

At block 708, the MO engine 103 determines a risk dependent state of each node (or each node that is still deemed to be qualified).

At block 710, the MO engine 103 determines an average sojourn time for each node (or each node that is still deemed to be qualified). In one embodiment, the sojourn time may be provided by or calculated from the data 117 received from a version control repository 116. Thus, the version control repository can provide raw information regarding average arrival rates for different applications to the MO engine 103, which then processes the data 117 to determine the average arrival rate for an application therefrom.

At block 712, the MO engine 103 calculates a failure index for each node (or each node that is stilled deemed to be qualified). This failure index is based on the average arrival rate of the application, the resource parameters of the application, the residual capacity of the node, the risk dependent state of the node and an average sojourn time of the node.

At block 714, the MO engine 103 provisions a release of the application on the node that has a lowest calculated failure index. By virtue of placing the release of the application on the identified node, the probability of failure of the application is substantially reduced until the next expected release of the application.

Example Computer Platform

Figure 8:
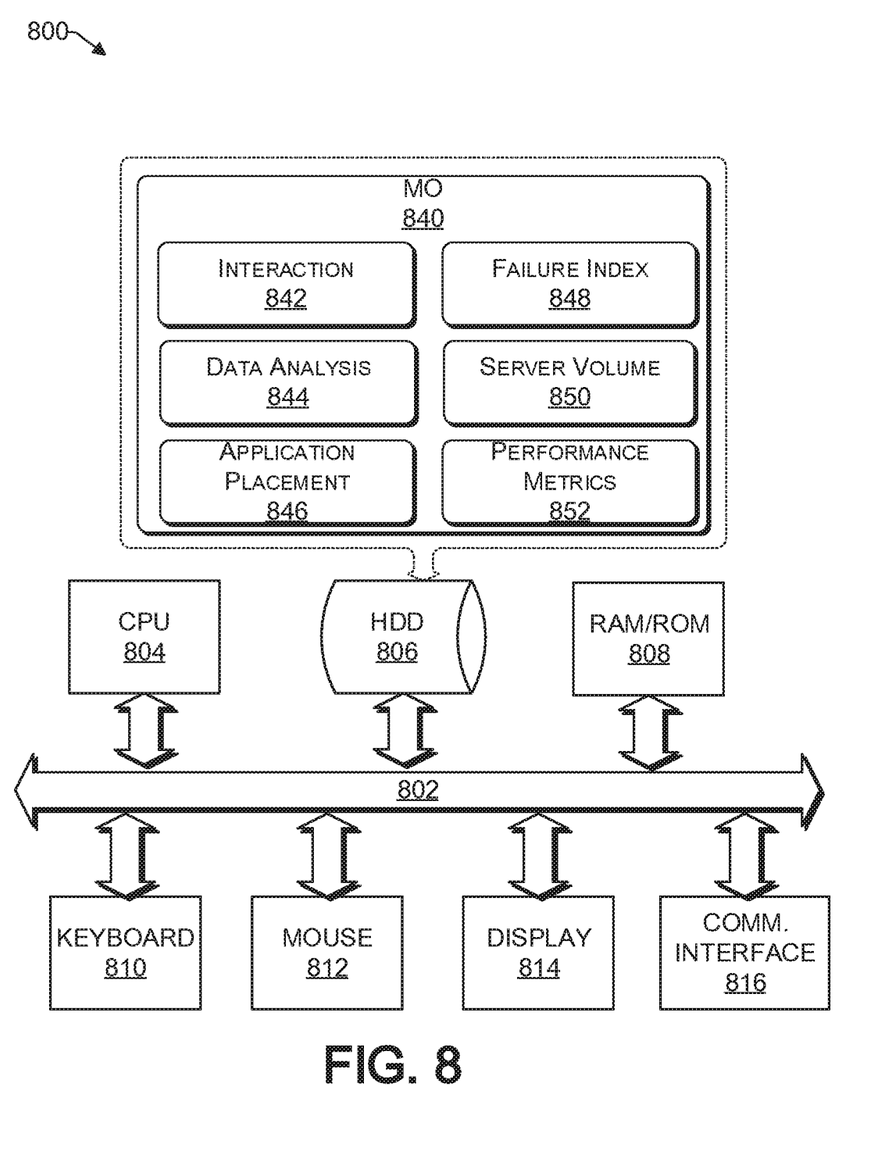
FIG. 8 provides a functional block diagram illustration of a computer hardware platform that is capable of orchestrating the provisioning of applications on their appropriate node in a cloud.

As discussed above, functions relating to provisioning a release of an application into a distributed computing environment can be performed with the use of one or more computing devices connected for data communication via wireless or wired communication, as shown in FIG. 1 and in accordance with the process 700 of FIG. FIG. 8 provides a functional block diagram illustration of a computer hardware platform that is capable of orchestrating the provisioning of applications on their appropriate node in a cloud. In particular, FIG. 8 illustrates a network or host computer platform 800, as may be used to implement a server, such as the provisioning server 130 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the MO engine 840, in a manner described herein. To that end, the MO engine 840 may have various modules configured to perform different functions.

For example, there may be an interaction module 842 that is operative to receive electronic data from various sources, including data 117 from the version control repository 116, performance metrics 115 from the node performance metrics database 114, data 113 from the vulnerability database 112, and releases from developers that are to be provisioned onto nodes 121 of the cloud 120.

In one embodiment, there is a data analysis module 844 operative to determine the update frequency of an application, the sojourn time of states of nodes, and the failure probability of each state of a node.

There may be an application placement module 846 operative to identify a node in a pool of nodes that is the most appropriate node in terms of lowest risk of failure to provision a release of the application thereon.

There may be a failure index module 848 operative to calculate various failure indexes of nodes based on various parameters harvested by the interactive module 842 of the MO engine 840. The failure index module 848 may take into consideration that a server in state i fails before the next release of the application j, as discussed herein.

There may be a server volume module 850 operative to determine the optimal number of nodes to accommodate the applications that the MO engine 840 is responsible for. In this regard, it is noted that an application is not distributed onto several nodes; rather, to reduce the probability of failure of a subject application, the subject application is provisioned onto a single node having the configuration that is deemed to best accommodate the subject application. While each application is on a single node, there may be several applications on a single node. An optimal number of nodes is calculated by the volume module 850 to reduce the failure probability and cost associated with having redundant nodes.

In one embodiment, there is a performance metrics module 852 operative to evaluate the performance metrics 115 received from the node performance metrics database 114. In some embodiments, the performance metrics module 852 includes the functionality of the node performance metrics database 114.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

Example Cloud Platform

As discussed above, functions relating to provisioning a release of an application to an appropriate node in a distributed computing architecture, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
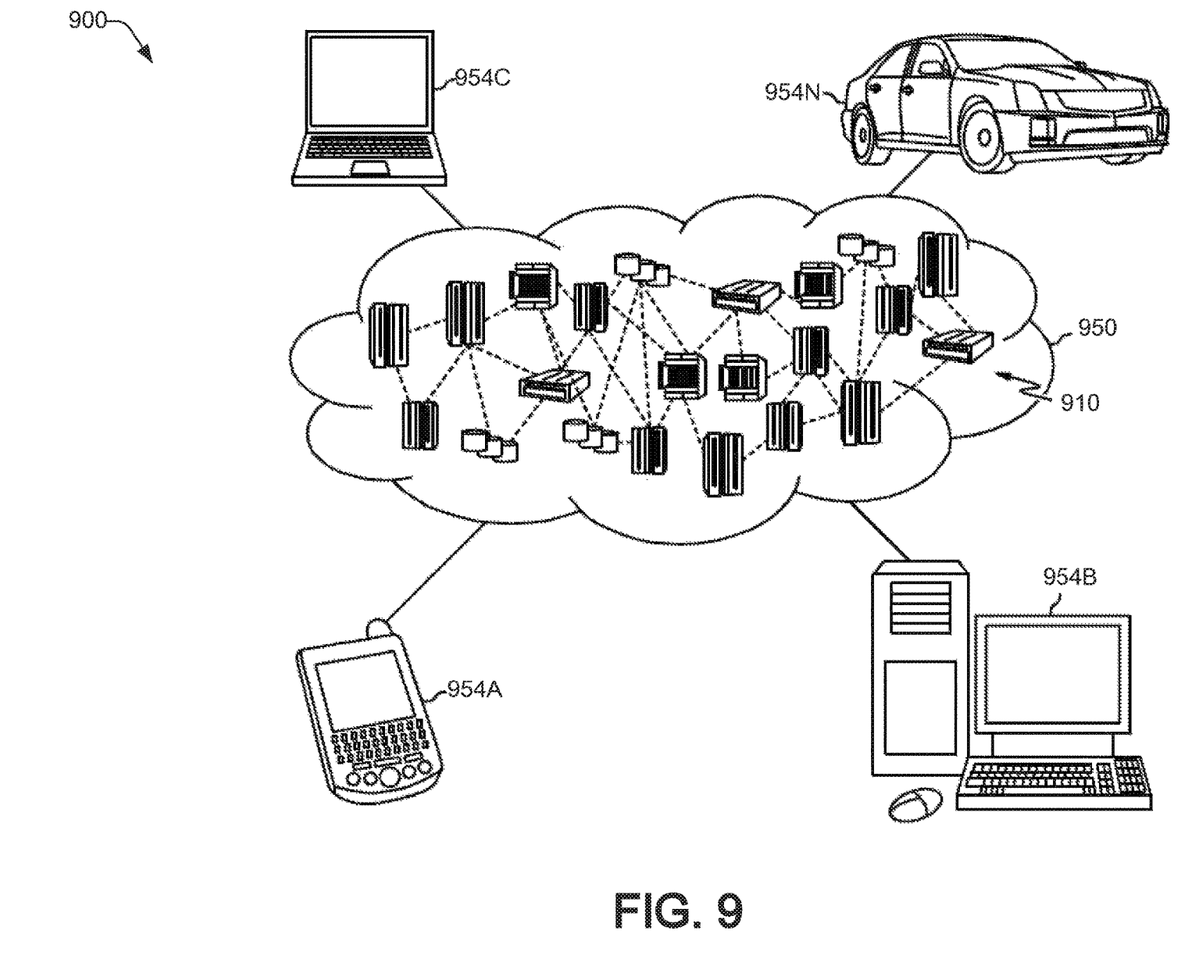
FIG. 9 depicts a cloud computing environment, consistent with an illustrative embodiment.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
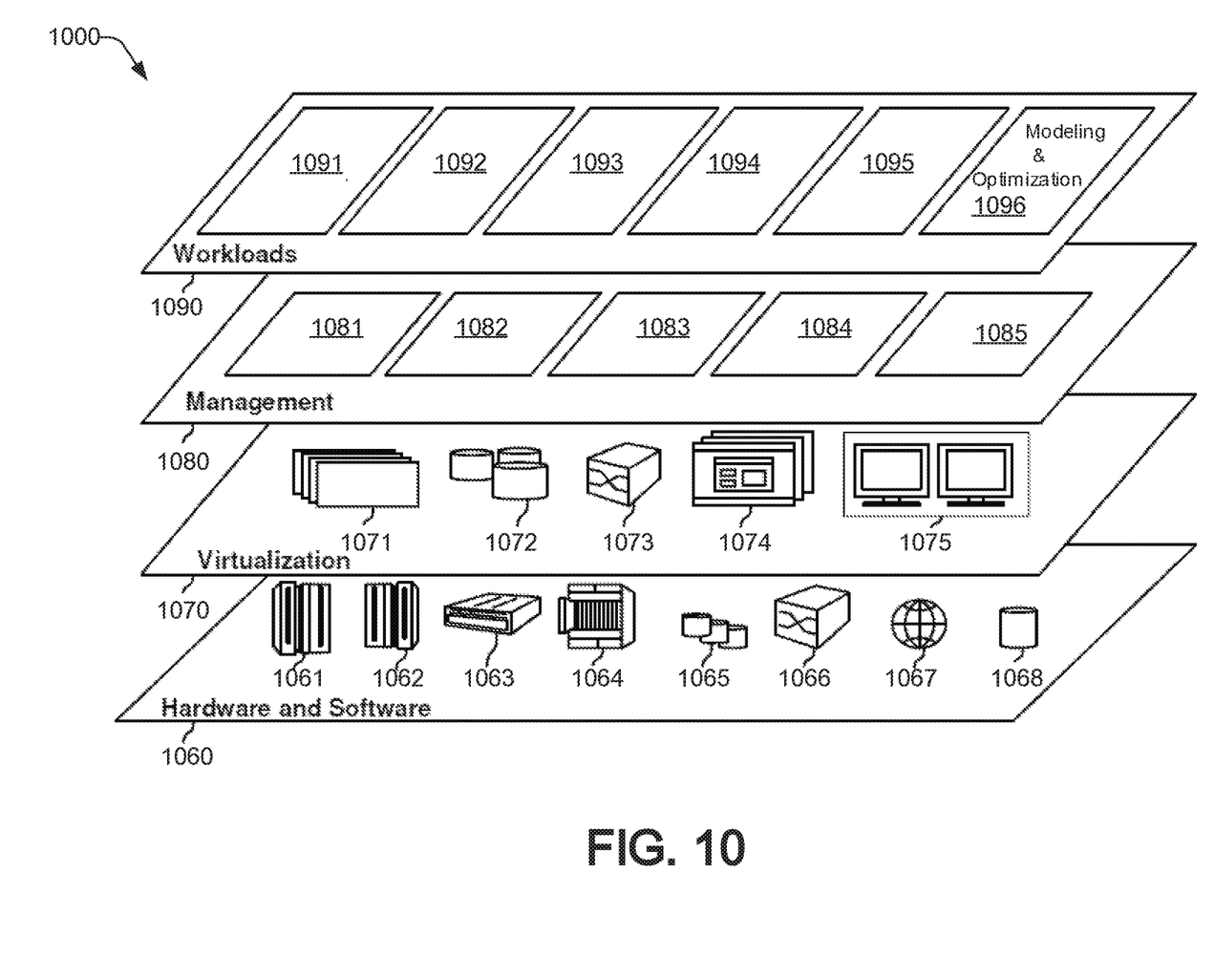
FIG. 10 depicts abstraction model layers, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and risk aware application release placement modeling and optimization 1096, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a code stored in the storage device, wherein an execution of the code by the processor configures the computing device to perform acts comprising:
calculating an average arrival rate for an application;
determining a residual capacity of each node in a pool of nodes;
determining a risk dependent state of each node;
calculating, for each node, a failure index based on the average arrival rate of the application, the residual capacity of the node, and the risk dependent state of the node; and
provisioning a release of the application on a node in the pool of nodes, based on the calculated failure index.

2. The computing device of claim 1, wherein execution of the code by the processor further configures the computing device to perform acts comprising:
determining resource parameters of the application; and
determining an average sojourn time for each node, wherein the failure index for each node is further based on:
the determined resource parameters, and
the determined sojourn time of the node.

3. The computing device of claim 2, wherein the resource parameters of the application include at least one of: (i) computing, (ii) memory, and (iii) storage resources to run the application.

4. The computing device of claim 3, wherein the risk dependent state is determined only of nodes that are identified to have a residual capacity that is above a threshold based on the resource parameters of the application.

5. The computing device of claim 2, wherein execution of the code by the processor further configures the computing device to perform acts comprising: upon determining the residual capacity each node in the pool of nodes, limiting the determination of the risk dependent state and the determination of the average sojourn time, to nodes that have a residual capacity that is at or above a predetermined threshold.

6. The computing device of claim 1, wherein provisioning the release of the application is on a node calculated to have a lowest failure index.

7. The computing device of claim 1, wherein determining the residual capacity of a node comprises:
determining a static capacity of the node;
determining a dynamic usage of the node; and
calculating a difference between the static capacity and the dynamic usage of the node.

8. The computing device of claim 7, wherein:
the static capacity of the node comprises at least one of: (i) a processing capability, (ii) a memory capability, and (iii) a storage amount of the node; and
the dynamic usage of the node comprises an amount of the static capacity that is in use.

9. The computing device of claim 1, wherein determining a risk dependent state of a node comprises:
determining risk parameters of the node; and
assigning the risk dependent state based on the determined risk parameters of the node.

10. The computing device of claim 9, wherein the risk parameters of the node comprise at least one of:
an operating system of the node;
vulnerabilities of the operating system of the node;
whether the node has patches for the vulnerabilities; and
a failure rate of the node.

11. The computing device of claim 1, wherein execution of the code by the processor further configures the computing device to perform acts comprising: upon determining that a predetermined number of nodes are (i) in or above a risk dependent state and (ii) have a residual capacity that is above a threshold, limiting a number of nodes to be evaluated to a predetermined number.

12. A non-transitory computer readable storage medium tangibly embodying a computer readable program code having computer readable instructions that, when executed, causes a computer device to carry out a method of provisioning a release of an application, the method comprising:
calculating an average arrival rate for the application;
determining a residual capacity of each node in a pool of nodes;
determining a risk dependent state of each node;
calculating, for each node, a failure index based on the average arrival rate of the application, the residual capacity of the node, and the risk dependent state of the node; and
provisioning the release of the application on a node in the pool of nodes, based on the calculated failure index.

13. The non-transitory computer readable storage medium of claim 12, further comprising:
determining resource parameters of the application; and
determining an average sojourn time for each node, wherein the failure index for each node is further based on:
the determined resource parameters, and
the determined sojourn time of the node.

14. The non-transitory computer readable storage medium of claim 12, wherein provisioning the release of the application is on a node calculated to have a lowest failure index.

15. The non-transitory computer readable storage medium of claim 13, wherein the resource parameters of the application include at least one of: (i) computing, (ii) memory, and (iii) storage resources to run the application.

16. The non-transitory computer readable storage medium of claim 15, wherein the risk dependent state is determined only of nodes that are identified to have a residual capacity that is above a threshold based on the resource parameters of the application.

17. The non-transitory computer readable storage medium of claim 12, wherein determining the residual capacity of a node comprises:
determining a static capacity of the node;
determining a dynamic usage of the node; and
calculating a difference between the static capacity and the dynamic usage of the node.

18. The non-transitory computer readable storage medium of claim 17, wherein:
the static capacity of the node comprises at least one of:
(i) a processing capability, (ii) a memory capability, and (iii) a storage amount of the node; and
the dynamic usage of the node comprises an amount of the static capacity that is in use.

19. The non-transitory computer readable storage medium of claim 12, wherein determining a risk dependent state of a node comprises:
determining risk parameters of the node; and
assigning the risk dependent state based on the determined risk parameters of the node.

20. The non-transitory computer readable storage medium of claim 19, wherein the risk parameters of the node comprise at least one of:
an operating system of the node;
vulnerabilities of the operating system of the node;
whether the node has patches for the vulnerabilities; and
a failure rate of the node.

* * * * *